United States Patent
Miyamoto et al.

(10) Patent No.: US 9,279,036 B1
(45) Date of Patent: Mar. 8, 2016

(54) POLYAMIDEIMIDE PRECURSOR COMPOSITION, POLYAMIDEIMIDE MOLDED ARTICLE, AND METHOD FOR PREPARING POLYAMIDEIMIDE MOLDED ARTICLE

(71) Applicant: FUJI XEROX CO., LTD., Tokyo (JP)

(72) Inventors: Tsuyoshi Miyamoto, Kanagawa (JP); Kana Miyazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/722,736

(22) Filed: May 27, 2015

(30) Foreign Application Priority Data

Dec. 26, 2014 (JP) ................................. 2014-266085

(51) Int. Cl.
*C08G 73/14* (2006.01)
*C08L 79/08* (2006.01)
*C08J 5/18* (2006.01)

(52) U.S. Cl.
CPC ...................................... *C08G 73/14* (2013.01)

(58) Field of Classification Search
None
See application file for complete search history.

(56) References Cited

FOREIGN PATENT DOCUMENTS

| JP | H02-11615 B2 | 3/1990 |
| JP | H11-106508 A | 4/1999 |
| JP | 2011-213849 A | 10/2011 |

*Primary Examiner* — Ana Woodward
(74) *Attorney, Agent, or Firm* — Oliff PLC

(57) ABSTRACT

A polyamideimide precursor composition includes a resin having repeating units represented by the following formula (PA) and a solvent including water, wherein the resin is dissolved in the solvent:

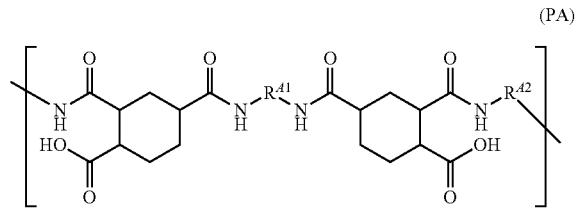

(PA)

wherein $R^{41}$ represents a divalent organic group and $R^{42}$ represents a divalent organic group.

11 Claims, No Drawings

POLYAMIDEIMIDE PRECURSOR COMPOSITION, POLYAMIDEIMIDE MOLDED ARTICLE, AND METHOD FOR PREPARING POLYAMIDEIMIDE MOLDED ARTICLE

CROSS-REFERENCE TO RELATED APPLICATIONS

This application is based on and claims priority under 35 USC 119 from Japanese Patent Application No. 2014-266085 filed Dec. 26, 2014.

BACKGROUND

1. Technical Field

The present invention relates to a polyamideimide precursor composition, a polyamideimide molded article, and a method for preparing a polyamideimide molded article.

2. Related Art

A polyimide resin and a polyamideimide resin each are a material characterized by excellent durability, heat resistance, and stability, and have been widely used in electronic material applications such as an electronic circuit board and a flexible copper-clad laminate.

Recently, the polyimide resin and the polyamideimide resin have also been used in applications requiring transparency such as coating materials for solar cells, or the like, in addition to liquid crystal alignment agents and protective films in liquid crystal display elements.

SUMMARY

According to an aspect of the invention, there is provided a polyamideimide precursor composition including a resin having repeating units represented by the following formula (PA) and a solvent including water,
wherein the resin is dissolved in the solvent:

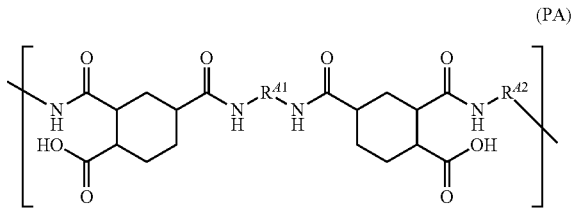

wherein $R^{41}$ represents a divalent organic group and $R^{42}$ represents a divalent organic group.

DETAILED DESCRIPTION

Hereinafter, the exemplary embodiments of the invention will be described in detail.

Polyamideimide Precursor Composition

The polyamideimide precursor composition according to the present exemplary embodiment is a composition including a resin having repeating units represented by the formula (PA) (hereinafter referred to as a "specific polyamideimide precursor") dissolved in a solvent including water (hereinafter referred to as an "aqueous solvent" for the sake of convenience). That is, the specific polyamideimide precursor is included in the composition in the state in which the precursor is dissolved in the aqueous solvent. Further, the dissolution means a state in which no residues of the solutes may be visually observed.

With the polyamideimide precursor composition according to the present exemplary embodiment, molding of a polyamideimide molded article having excellent transparency is accomplished. The reason for this is not clear, but it is presumably due to the following reason.

When the specific polyamideimide precursor having repeating units represented by the formula (PA) is imidized, in spite of its non-conjugated structure, a polyamideimide molded article having high mechanical strength is easily obtained.

On the other hand, with the specific polyamideimide precursor, a polyamideimide molded article having transparency is also easily obtained. However, when a polyamideimide precursor composition in which the specific polyamideimide precursor is dissolved in a single solvent of an aprotic polar solvent (for example, NMP) is used to carry out molding, a higher heating temperature and a longer period of heating time are also required in view of removal of the solvent, and yellowing of the obtained polyamideimide molded article may occur in some cases. For this reason, it is, currently required to further improve the transparency of a polyamideimide molded article formed by using the specific polyamideimide precursor.

In contrast, when a polyamideimide precursor composition in which a specific polyamideimide precursor is dissolved in an aqueous solvent is used to carry out molding, a lower heating temperature and a shorter heating time to evaporate the solvent are accomplished. Thus, occurrence of yellowing of the obtained polyamideimide molded article is prevented.

From the description above, with the polyamideimide precursor composition according to the present exemplary embodiment, molding of the polyamideimide molded article having excellent transparency is accomplished.

Moreover, the polyamideimide formed by imidization of the specific polyamideimide precursor has high mechanical strength and heat resistance. For this reason, with the polyamideimide precursor composition according to the present exemplary embodiment, molding of the polyamideimide molded article having transparency and excellent mechanical strength and heat resistance is easily accomplished.

Furthermore, the specific polyamideimide precursor has solubility in an aqueous solvent, and the storage stability of the polyamideimide precursor composition is easily secured. For this reason, film forming properties of the polyamideimide precursor composition according to the present exemplary embodiment are secured, and thus, formation of voids and unevenness on the surface of the polyamideimide molded article is easily prevented. As a result, molding of a polyamideimide molded article having excellent transparency and surface properties is easily accomplished.

In addition, since the polyamideimide precursor composition according to the present exemplary embodiment has a solvent including water applied as a solvent, it is also excellent in environmental suitability.

In the polyamideimide precursor composition according to the present exemplary embodiment, an organic amine compound is preferably dissolved in an aqueous solvent. In a case where an organic amine compound is dissolved in an aqueous solvent, a specific polyamideimide precursor (a carboxyl group thereof) easily goes into the state in which it is converted into an amine salt with the organic amine compound, and the solubility of the specific polyamideimide precursor in the aqueous solvent is easily increased. In addition, a change in the viscosity of the polyamideimide precursor composition is easily decreased even over a long period of time. For this reason, the film forming properties are also easily increased.

Furthermore, the organic amine compound easily exhibits an excellent imidization promoting action when the polyamideimide molded article is molded using the polyamideimide precursor composition. For this reason, polyamideimide resin molded article having excellent mechanical strength is obtained, and further, a polyamideimide molded article which is also excellent in various other characteristics such as heat resistance, electrical characteristics, and solvent resistance is easily obtained. In addition, the imidization promoting action also enhances productivity.

Incidentally, since the organic amine compound is easily dissolved in a solvent while being converted into an amine salt with the specific polyamideimide precursor (a carboxyl group thereof), an unfavorable odor unique to the organic amine compound is easily prevented.

In addition, the organic amine compound easily exhibits a function of preventing corrosion of a substrate which will be a base material during molding of the polyamideimide molded article. This is presumed to be due to a fact that the acidity of a carboxyl group of the specific polyamideimide precursor is prevented by the basicity of the coexistent organic amine compound.

Hereinafter, the respective components of the polyamideimide precursor composition according to the present exemplary embodiment will be described.

Specific Polyamideimide Precursor

The specific polyamideimide precursor is a resin having repeating units represented by the formula (PA). Further, the imidization rate of the specific polyamideimide precursor is preferably 0.2 or less.

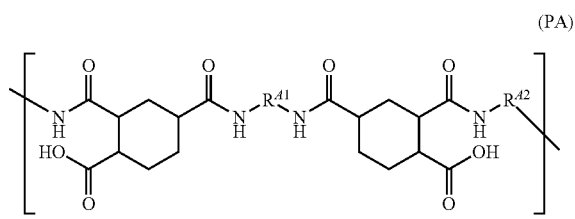

(PA)

In the formula (PA), $R^{41}$ represents a divalent organic group and $R^{42}$ represents a divalent organic group.

Here, the divalent organic group represented by $R^{41}$ represents a group linked between two NH groups of a tetracarboxylic dianhydride which will be a raw material (a group linked between two NH groups in a residue formed by removing two carboxyl groups from the tetracarboxylic dianhydride).

The divalent organic group represented by $R^{42}$ represents a group linked between two $NH_2$ groups of a diamine compound which will be a raw material (a residue formed by removing two amino groups from the diamine compound).

That is, the specific polyamideimide precursor having repeating units represented by the formula (PA) is a polymer from a tetracarboxylic dianhydride and a diamine compound.

The tetracarboxylic dianhydride will be described.

As the tetracarboxylic dianhydride, a tetracarboxylic dianhydride represented by the formula (TC) is applied.

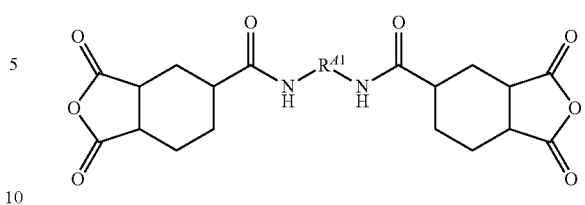

(TC)

In the formula (TC), $R^{41}$ represents a divalent organic group. Further, $R^{41}$ in the formula (TC) corresponds to $R^{41}$ in the formula (PA).

Examples of the divalent organic group represented by $R^{41}$ include aromatic or aliphatic divalent organic groups. As the divalent organic group represented by $R^{41}$, aromatic divalent organic groups are preferable from the viewpoint of improvement of various characteristics such as mechanical strength and heat resistance of a polyamideimide molded article. Examples of the aromatic divalent organic groups include divalent organic groups having one or more (for example, 1 or 2) benzene rings. Preferable examples of the aromatic divalent organic groups (divalent organic groups represented by $R^{41}$) include groups represented by the following structure (T-1) or (T-2).

(T-1)

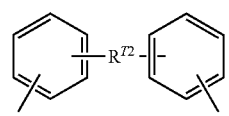

(T-2)

In Structure (T-2), $R^{72}$ represents —O—, —$SO_2$—, an alkylene group, or —O—$R^{73}$—O—, and $R^{73}$ represents an alkylene group.

In Structure (T-2), examples of the alkylene group represented by $R^{72}$ include an alkylene group having 1 to 12 (preferably 4 to 6) carbon atoms. The alkylene group may be a linear, branched, or cyclic alkylene group, but a linear or branched alkylene group is preferable. Specific examples of the alkylene group include a methylene group, an ethylene group, an n-propylene group, an isopropylene group, an n-butylene group, an isobutylene group, a sec-butylene group, a tert-butylene group, an n-pentylene group, an isopentylene group, a neopentylene group, a tert-pentylene group, an n-hexylene group, a sec-hexylene group, a tert-hexylene group, a heptyl group, an octylene group, and a dodecylene group. Among these, as the alkylene group, an ethylene group, an isopropylene group, an n-butylene group, or an n-hexylene group is preferable.

Examples of the alkylene group represented by $R^{73}$ in Structure (T-2) include —$(C_xC_{2x})_n$—. x represents an integer of 1 to 12 (preferably 1 to 6) n represents an integer of 1 to 6 (preferably 1 to 2). Further, "$C_xC_{2x}$" may be either linear or branched.

Specific examples of the tetracarboxylic dianhydride represented by the formula (TC) are shown below. However, the invention is not limited to these specific examples. Further, n in the exemplary compound TC-11 represents an integer of 6. Further, n in exemplary compound TC-12 represents an integer of 6.

| Exemplary compound No. | $R^{A1}$ |
|---|---|
| TC-01 | 1,4-phenylene |
| TC-02 | 1,3-phenylene |
| TC-03 | 4,4'-oxydiphenylene |
| TC-04 | 4,3'-oxydiphenylene |
| TC-05 | 4,4'-sulfonyldiphenylene |
| TC-06 | 4,3'-sulfonyldiphenylene |
| TC-07 | 4,4'-methylenediphenylene |
| TC-08 | 4,3'-methylenediphenylene |
| TC-09 | 4,4'-isopropylidenediphenylene |
| TC-10 | 4,3'-isopropylidenediphenylene |
| TC-11 | 4,4'-(—O—(CH$_2$)$_n$—O—)diphenylene |
| TC-12 | 4,3'-(—O—(CH$_2$)$_n$—O—)diphenylene |

The tetracarboxylic dianhydrides represented by the formula (TC) may be used alone or in combination of two or more kinds thereof.

Here, as the tetracarboxylic dianhydride, tetracarboxylic dianhydrides other than the tetracarboxylic dianhydride represented by the formula (TC) may be used in combination. However, the tetracarboxylic dianhydride represented by the formula (TC) is preferably used in the amount of 90% by mole or more with respect to all the tetracarboxylic dianhydrides.

Examples of the other tetracarboxylic dianhydrides include aromatic or aliphatic compounds, but the aromatic compounds are preferable.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid)phenylphosphineoxide dianhydride, p-phenylene-bis(triphenylphthalicacid)dianhydride, m-phenylene-bis(triphenylphthalic acid)dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among those, as the other tetracarboxylic dianhydride, aromatic tetracarboxylic dianhydrides are preferable, and specifically, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, and 3,3',4,4'-benzophenonetetracarboxylic dianhydride are preferable, pyromellitic dianhydride, 3,3',4,4'-biphenyltetracarboxylic dianhydride, and 3,3',4,4'-benzophenonetetracarboxylic dianhydride are more preferable, and 3,3',4,4'-biphenyltetracarboxylic dianhydride is particularly preferable.

Moreover, the other tetracarboxylic dianhydrides may be used alone or in combination of two or more kinds thereof. Further, in a case where a combination of two or more kinds of the other tetracarboxylic dianhydrides is used, a combination of two or more of the aromatic tetracarboxylic dianhydrides, a combination of two or more of the aliphatic tetracarboxylic dianhydrides, or a combination of at least one aromatic tetracarboxylic dianhydride and at least one aliphatic tetracarboxylic dianhydride may be used.

Next, the diamine compound will be described.

The diamine compound is a diamine compound having two amino groups in the molecular structure thereof. Examples of the diamine compound include any aromatic or aliphatic diamine compounds, but the aromatic diamine compounds are preferable.

Examples of the diamine compound include aromatic diamine compounds such as p-phenylenediamine, m-phenylenediamine, 4,9'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups such as diaminotetraphenyl thiophene; and aliphatic and alicyclic diamine compounds such as 1,1-metaxylylenediamine, 1,3-propanediamine, tetramethylenediamine, pentamethylenediamine, octamethylenediamine, nonamethylenediamine, 4,1-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,0$^{2.7}$]-undecylene dimethyldiamine, and 4,4'-methylenebis(cyclohexylamine).

Among those, as the diamine compound, aromatic diamine compounds are preferable, specifically, for example, p-phenylenediamine, m-phenylenediamine, 4,4'-diaminodiphenylmethane, 4,4'-diaminodiphenylether, 3,4'-diaminodiphenylether, 4,4'-diaminodiphenylsulfide, and 4,4'-diaminodiphenylsulfone are preferable, and 4,4'-diaminodiphenylether and p-phenylenediamine are particularly preferable.

Moreover, the diamine compounds may be used alone or in combination of two or more kinds thereof. Further, in a case where two or more kinds thereof are used in combination, a combination of two or more of the aromatic diamine compounds, a combination of two or more of the aliphatic diamine compounds, or a combination of at least one aromatic diamine compound and at least one aliphatic diamine compound may be used.

Ratio of Tetracarboxylic Dianhydride to Diamine Compound

In the specific polyamideimide precursor, the molar equivalents of the diamine compound are preferably larger than the molar equivalents of the tetracarboxylic dianhydride. When this relationship is satisfied, the film forming properties of the polyamideimide precursor composition are easily enhanced. In addition, the mechanical strength of the polyamideimide molded article is also easily increased.

This relationship is accomplished by adjusting the molar equivalents of the diamine compound used in the polymerization reaction to be in excess of the molar equivalents of the tetracarboxylic dianhydride. Regarding the ratio of the molar equivalents of the tetracarboxylic dianhydride to the molar equivalents of the diamine compound, the molar equivalents of the diamine compounds with respect to one molar equivalent of the tetracarboxylic dianhydride are preferably in the range of 1.0001 to 1.2000, and more preferably in the range of 1.0010 to 1.2000.

When the ratio of the molar equivalents of the diamine compound to the molar equivalents of the tetracarboxylic dianhydride is 1.0001 or more, the effect of the amino group at a terminal of the molecule is increased, the dispersion properties of the specific polyamideimide precursor are increased, and thus the film forming property of the polyamideimide precursor composition is easily improved. Further, the mechanical strength of the polyamideimide molded article is easily enhanced. In addition, the dispersion of various fillers added in order to provide the polyamideimide molded article with various functions is promoted, and thus, superior functions are easily exhibited even with a small amount of a filler. On the other hand, when the ratio of the molar equivalents is 1.2000 or less, the molecular weight the polyamideimide precursor is easily increased, and thus, for example, when forming the polyamideimide molded article into a film, the film strength (tear strength and tensile strength) is easily obtained.

Here, in the specific polyamideimide precursor, the ratio of the molar equivalents of the diamine compound to the molar equivalents of the tetracarboxylic dianhydride is measured in the following manner. The specific polyamideimide precursor resin is subjected to a hydrolysis treatment in a basic aqueous solution of sodium hydroxide, potassium hydroxide, or the like to be thereby decomposed into a diamine compound and a tetracarboxylate. The obtained sample is analyzed by gas chromatography, liquid chromatography, or the like, and the proportions of the tetracarboxylic dianhydride and the diamine compound constituting the specific polyamideimide precursor are determined.

Terminal Structure of Polyamideimide Precursor

The specific polyamideimide precursor preferably includes a polyamideimide precursor (resin) having an amino group at a terminal thereof, and preferably is a polyamideimide precursor having amino groups on all terminals thereof.

When the polyamideimide precursor (resin) having a terminal amino group is included, the effect of the amino group at a terminal of the molecule is improved, the dispersion properties of the specific polyamideimide precursor is increased, and thus, the film forming properties of the polyamideimide precursor composition are easily improved. Further, the mechanical strength of the polyamideimide molded article is easily increased. Further, the dispersion of various fillers added so as to impart various functions to the polyamideimide molded article is promoted, and thus, superior functions are easily exhibited even with a small amount of the filler.

Some or all of the terminal amino groups of the polyamideimide precursor having a terminal amino group may be sealed with a dicarboxylic anhydride or the like. When the terminal amino groups are sealed, the storage stability of the polyamideimide precursor composition is easily increased.

Examples of the dicarboxylic anhydride used to seal the terminal amino group include phthalic anhydride and fumaric anhydride.

The terminal amino group of the specific polyamideimide precursor is detected by allowing trifluoroacetic anhydride to undergo a reaction (quantitative reaction with amino groups) with a polyamideimide precursor composition. That is, the terminal amino group of the specific polyamideimide precursor is amidated with trifluoroacetic acid. After the treatment, the specific polyamideimide precursor is purified by reprecipitation or the like to remove excessive trifluoroacetic anhydride or residues of trifluoroacetic acid. The specific polyamideimide precursor after the treatment is quantified by means of a nuclear magnetic resonance (NMR) method to measure the amount of the terminal amino groups of the specific polyamideimide precursor.

Imidization Rate of Polyamideimide Precursor

The specific polyamideimide precursor is preferably a resin having an imidization rate of 0.2 or less (preferably 0.15, and more preferably 0.10). That is, the specific polyamideimide precursor may also be a resin which is partially imidized.

When the imidization rate is set to 0.2 or less, gelation or separation by precipitation of the polyamideimide precursor composition is prevented, and thus, deterioration of storage stability and film forming properties is easily prevented.

The imidization rate of the specific polyamideimide precursor is measured by the method described in Examples described below.

Number Average Molecular Weight of Polyamideimide Precursor

The number average molecular weight of the specific polyamideimide precursor is preferably from 1000 to 100000, more preferably from 5000 to 50000, and still more preferably from 10000 to 30000. When the number average molecular weight of the specific polyamideimide precursor is within the above range, the decrease in the solubility of the specific polyamideimide precursor in a solvent is prevented, and thus, the film forming properties are easily improved. In particular, in a case where a specific polyamideimide precursor including a resin having a terminal amino group and having a lower molecular weight is applied, the precursor has a higher existence ratio of the terminal amino groups, and is therefore affected by the coexistent organic amine compound in the polyamideimide precursor composition to thereby decrease the solubility in some cases. However, the decrease in the solubility may be prevented by setting the number average molecular weight of the specific polyamideimide precursor to be within the above range.

In addition, a specific polyamideimide precursor having a desired number average molecular weight is obtained by adjusting the ratio of the molar equivalents of the tetracarboxylic dianhydride to the molar equivalents of the diamine compound.

The number average molecular weight of the specific polyamideimide precursor is measured by gel permeation chromatography (GPC) under the following measurement conditions.

Column: TSKgel α-M (7.8 mm I.D.×30 cm) manufactured by Tosoh Corporation
Eluent: dimethylformamide (DMF)/30 mM LiBr/60 mM phosphoric acid
Flow rate: 0.6 mL/min
Injection amount: 60 μL
Detector: RI (Differential refractive index detector)

Content of Specific Polyamideimide Precursor

The content (concentration) of the specific polyamideimide precursor is preferably from 0.1% by weight to 40% by weight, more preferably from 0.5% by weight to 25% by weight, and still more preferably from 1% by weight to 20% by weight, based on the entire polyamideimide precursor composition.

Aqueous Solvent

The aqueous solvent is a solvent including water. Specifically, the aqueous solvent is preferably a solvent including water in an amount of 10% by weight or more with respect to the entire aqueous solvent. Here, the term "water-soluble" means that a target substance is dissolved at 1% by weight or more with respect to water at 25° C.

Examples of water include distilled water, ion-exchanged water, ultra-filtered water, and pure water.

The content of water is preferably from 50% by weight to 100% by weight, more preferably from 70% by weight to 100% by weight, still more preferably from 80% by weight to 100% by weight, and particularly preferably from 90% by weight to 100% by weight, with respect to the total aqueous solvent. Further, the aqueous solvent most preferably does not include a solvent other than water.

In a case where the aqueous solvent includes a solvent other than water, examples of the solvent other than water include a water-soluble organic solvent and an aprotic polar solvent. As the solvent other than water, a water-soluble organic solvent is preferable from the viewpoints of the transparency, the mechanical strength, and the like of the polyamideimide molded article. Particularly, from the viewpoints of enhancing various characteristics such as heat resistance, electrical characteristics, and solvent resistance, in addition to the transparency and the mechanical strength, of the polyamideimide molded article, the aqueous solvent preferably does not include an aprotic polar solvent or include, if any, a small amount of an aprotic polar solvent for example, 10% by weight or less with respect to the total of the water-soluble solvent).

Examples of the water-soluble organic solvent include a water-soluble ether solvent, a water-soluble ketone solvent, and a water-soluble alcohol solvent.

The water-soluble organic solvents may be used alone, but in a case where they are used in combination of two or more kinds thereof, examples of the combination include a combination of a water-soluble ether solvent and a water-soluble alcohol solvent, a combination of a water-soluble ketone solvent and a water-soluble alcohol solvent, and a combination of a water-soluble ether solvent, a water-soluble ketone solvent, and a water-soluble alcohol solvent.

The water-soluble ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether. Among these, tetrahydrofuran and dioxane are preferable as the water-soluble ether solvent.

The water-soluble ketone solvent is a water-soluble solvent having a ketone group in one molecule. Examples of the water-soluble ketone solvent include acetone, methyl ethyl ketone, and cyclohexanone. Among these, acetone is preferable as the water-soluble ketone solvent.

The water-soluble alcohol solvent is a water-soluble solvent having an alcoholic hydroxyl group in one molecule. Examples of the water-soluble alcohol solvent include methanol, ethanol, 1-propanol, 2-propanol, tert-butylalcohol, ethylene glycol, a monoalkyl ether of ethylene glycol, propylene glycol, a monoalkyl ether of propylene glycol, diethylene glycol, a monoalkyl ether of diethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, as the water-soluble alcohol solvent, methanol, ethanol, 2-propanol, ethylene glycol, a monoalkyl ether of ethylene glycol, propylene glycol, a monoalkyl ether of propylene glycol, diethylene glycol, and a monoalkyl ether of diethylene glycol are preferable.

The aprotic polar solvent refers to a solvent having a boiling point of 150° C. to 300° C. and a dipole moment of 3.0 D to 5.0 D. Specific examples of the aprotic polar solvent include N-methyl-2-pyrrolidone (NMP), N,N-dimethylformamide (DMF), N,N-dimethylacetamide (DMAc), dimethylsulfoxide (DMSO), hexamethylenephosphoramide (HMPA), N-methylcaprolactam, and N-acetyl-2-pyrrolidone.

Incidentally, in a case where a solvent other than water is contained as the aqueous solvent, the solvent used in combination has a boiling point of preferably 250° C. or lower, more preferably 50° C. to 200° C., and still more preferably from 80° C. to 180° C. If the boiling point of the solvent used in combination is within the above range, it is promoted to accomplish a lower heating temperature and a shorter heating time during molding of a molded article, and a polyamideimide molded article having high transparency is easily obtained. Further, the solvent other than water does not easily remain in the polyamideimide molded article and a polyamideimide molded article having high mechanical strength is easily obtained.

Organic Amine Compound

The organic amine compound is a compound which converts a specific polyamideimide precursor (a carboxyl group thereof) to an amine salt so as to increase its solubility in the solvent, and functions as an imidization promoter. The organic amine compound is preferably a compound excluding a diamine compound which is a raw material for a polyamideimide precursor.

Further, the organic amine compound is preferably a water-soluble compound. Here, the term "water-soluble" means that a target substance is dissolved at 1% by weight or more with respect to water at 25° C.

Examples of the organic amine compound include a primary amine compound, a secondary amine compound, and a tertiary amine compound.

Among these, a tertiary amine compound is preferable as the organic amine compound. When the tertiary amine compound is applied as the organic amine compound, the solubility of the specific polyamideimide precursor in a solvent is easily increased, the film forming properties are easily improved, and further, the storage stability of the polyamideimide precursor composition is easily improved.

Furthermore, examples of the tertiary amine compound include, in addition to the monovalent amine compound, a divalent or higher polyvalent amine compound. When the divalent or higher polyvalent amine compound is applied, a pseudo-cross-linked structure between the molecules of the specific polyamideimide precursor is easily formed, and even when the specific polyamideimide precursor has a low molecular weight, the film forming properties are easily improved due to an increase in the viscosity of the polyamideimide composition.

Examples of the tertiary amine compound include an aromatic tertiary amine compound and an aliphatic tertiary amine compound.

Examples of the aromatic tertiary amine compound include pyridines (amine compounds having pyridine skeletons), pyrimidines (amine compounds having pyrimidine skeletons), pyrazines (amine compounds having pyrazine skeletons), quinolines (amine compounds having quinoline skeletons), and imidazoles (amine compounds having imidazole skeletons).

Among these, pyridines and imidazoles are preferable.

Examples of the pyridines include pyridine, α-picoline, β-picoline, γ-picoline, collidine, and lutidine.

Examples of the imidazoles include imidazole, 1-methylimidazole, 2-methylimidazole, 1-ethylimidazole, 2-ethylimidazole, 1,2-dimethylimidazole, 2-ethyl-4-methylimidazole, 4-ethyl-2-methylimidazole, and 1-methyl-4-ethylimidazole.

Examples of the aliphatic tertiary amine compound include an aliphatic chained tertiary amine compound and an aliphatic cyclic tertiary amine compound.

Examples of the aliphatic chained tertiary amine compound include 2-dimethylaminoethanol, 2-diethylaminoethanol, 2-dimethylaminopropanol, triethanolamine, and triethylamine.

Examples of the aliphatic cyclic tertiary amine compound include piperidines (amine compounds having piperidine skeletons), piperazines (amine compound having piperazine skeletons), morpholines (amine compounds having morpholine skeletons), pyrrolidines (amine compounds having pyrrolidine skeletons), and pyrazolidines (amine compounds having pyrazolidine skeletons).

Among these, piperidines represented by the following formula (1), piperazines represented by the following formula (2), morpholines represented by the following formula (3), pyrrolidines represented by the following formula (4), and pyrazolidines represented by the following formula (5) are preferable.

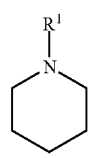

(1)

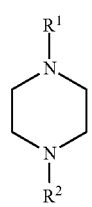

(2)

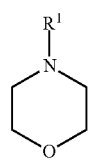

(3)

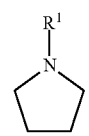

(4)

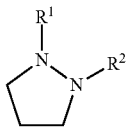

(5)

In the formulae (1) to (5), $R^1$ and $R^2$ each independently represent a hydrogen atom, an alkyl group having 1 to 6 carbon atoms, or a phenyl group.

Further, $R^1$ and $R^2$ are preferably a hydrogen atom, a methyl group, an ethyl group, a propyl group, a butyl group, a pentyl group, a hexyl group, or a phenyl group.

However, in the formulae (1), (3), and (4), $R^1$ represents a group other than a hydrogen atom. Further, in the formulae (2) and (5), at least one of $R^1$ and $R^2$ represents a group other than a hydrogen atom.

Here, from the viewpoint of the transparency of the polyamideimide molded article and the film forming properties of the polyamideimide precursor composition, as the organic amine compound, an aliphatic tertiary amine compound is preferable, morpholines are more preferable, and morpholine, methylmorpholine, and ethylmorpholine are even more preferable.

As the organic amine compound, a compound having a boiling point of 60° C. or higher (preferably from 60° C. to 200° C., and more preferably from 70° C. to 150° C.) is preferable. When the boiling point of the organic amine compound is set to 60° C. or higher, the organic amine compound is prevented from volatilizing from the polyamideimide precursor composition during storage, and reduction in the solubility of the specific polyamideimide precursor in a solvent is easily prevented.

The content of the organic amine compound is preferably from 50% by mole to 200% by mole (preferably from 50% by mole to 150% by mole, and more preferably from 100% by mole to 120% by mole) with respect to the carboxyl groups (—COOH) of the polyamideimide precursor in the polyamideimide precursor composition. When the content of the organic amine compound is set to 50% by mole or more, the polyamideimide precursor is easily dissolved in the aqueous solvent. When the content of the organic amine compound is set to 200% by mole or less, the stability of the organic amine compound in the solution is easily secured and further, unfavorable odor is easily prevented.

Other Additives

The polyamideimide precursor composition according to the present exemplary embodiment may contain various fillers and the like for the purpose of imparting various functions such as conductivity and mechanical strength to the polyamideimide molded article that is prepared using the composition, and may also contain a catalyst for promoting an imidization reaction, a leveling material for improving the quality of a prepared film, and the like.

Examples of the conductive material added for imparting conductivity include a conductive material (having a volume resistivity of, for example, less than $10^7$ Ω·cm, which shall apply hereinafter) and a semi-conductive material (having a volume resistivity of, for example, $10^7$ Ω·cm to $10^{13}$ Ω·cm, which shall apply hereinafter), and the material is selected according to the purpose of use.

Examples of conductive materials include carbon black (for example, acidic carbon black having a pH of 5.0 or less), metals (for example, aluminum and nickel), metal oxides (for example, yttrium oxide and tin oxide), ionic conductive substances (for example, potassium titanate and LiCl), and conductive polymers (for example, polyaniline, polypyrrole, polysulfone, and polyacetylene).

These conductive materials may be used alone or in combination of two or more kinds thereof.

In addition, in a case where the conductive material has a particle form, particles having a primary particle diameter of less than 10 and preferably 1 μm or less are preferable.

Examples of the filler added for enhancing the mechanical strength include materials in the form of particles, such as silica powder, alumina powder, barium sulfate powder, titanium oxide powder, mica, and talc. In addition, in order to improve water repellency or releasability of the surface of a polyamideimide molded article, fluorine resin powder such as polytetrafluoroethylene (PTFE) and a tetrafluoroethylene-perfluoroalkyl vinyl ether copolymer (PFA), and the like may be added.

As the catalyst for promoting the imidization reaction, a dehydrating agent such as an acid anhydride; an acid catalyst such as a phenol derivative, a sulfonic acid derivative, and a benzoic acid derivative; or the like may also be used.

A surfactant may be added to improve the quality of a film formed of the polyamideimide molded article, and as the surfactant to be used, any one of cationic, anionic, and nonionic surfactants may be used.

The content of other additives may be selected according to the purpose of use of the polyamideimide molded article to be prepared.

Method for Preparing Polyamideimide Precursor Composition

A method for preparing the polyamideimide precursor composition according to the present exemplary embodiment is not particularly limited, and examples thereof include the following methods (1) to (3).

Method (1): A tetracarboxylic dianhydride and a diamine compound are subjected to a polymerization reaction in an aqueous solvent to prepare a polyamideimide precursor composition.

Method (2): In the case of preparing a polyamideimide precursor composition including an organic amine compound, a tetracarboxylic dianhydride and a diamine compound are subjected to a polymerization reaction in the presence of an organic amine compound in an aqueous solvent to prepare a polyamideimide precursor composition.

Method (3): A tetracarboxylic dianhydride and a diamine compound are subjected to a polymerization reaction in an aqueous solvent, or a single solvent of an aprotic polar solvent to produce a polyamideimide precursor. A solution in which the polyamideimide precursor is produced is added to a poor solvent to carry out a reprecipitation treatment, and thus, a polyamideimide precursor resin is collected. An aqueous solvent (an aqueous solvent and an organic amine compound, as necessary) is added thereto, and the polyamideimide precursor resin is dissolved in the solvent to prepare a polyamideimide precursor composition.

Method for Preparing Polyamideimide Molded Article

A method for preparing the polyamideimide molded article according to the present exemplary embodiment is a method for preparing a polyamideimide molded article, in which the polyamideimide precursor composition according to the present exemplary embodiment (hereinafter also referred to as a "specific polyamideimide precursor composition") is subjected to a heating treatment to carry out molding.

Specifically, the method for preparing the polyamideimide molded article according to the present exemplary embodiment includes, for example, a step of coating a specific polyamideimide precursor composition onto an object to be coated, thereby forming a coating film (hereinafter referred to as a "coating film forming step"), and a step of subjecting the coating film to a heating treatment, thereby forming a polyamideimide resin layer (hereinafter referred to as a "heating step").

Coating Film Forming Step

First, an object to be coated is prepared. This object to be coated is selected according to the applications of a polyamideimide molded article to be prepared.

Specifically, in a case where a liquid crystal alignment film is prepared as a polyamideimide molded article, examples of the object to be coated include various substrates applied in liquid crystal elements, and examples thereof include a silicon substrate, a glass substrate, or substrates having a metal. or alloy film formed on the surface of these substrates.

Furthermore, in a case where a passivation film is prepared as a polyamideimide molded article, the object to be coated is selected from, for example, a semiconductor substrate having an integrated circuit formed thereon, a wiring substrate having wires formed thereon, a printed substrate having electronic parts and a wiring board provided thereon, and the like.

In addition, in a case where an electrical wire coating material is prepared as a polyamideimide molded article, examples of the object to be coated include various electrical wires (wires, bars, or plates of metals or alloys such as soft copper, hard copper, oxygen-free copper, chromium ore, and aluminum). Further, in a case where the polyamideimide molded article is molded and processed into a tape form, and used as a coating material for electrical wires in the form of a tape that is wound onto the electrical wire, various planar substrates or cylindrical substrates are used as the object to be coated.

In addition, in a case where an adhesive film is prepared as a polyamideimide molded article, examples thereof include various molded articles which are objects to be adhered (for example, various electrical parts such as a semiconductor chip and a printed substrate).

Next, the specific polyamideimide precursor composition is coated onto a desired object to be coated to form a coating film of the specific polyamideimide precursor composition.

The method for coating the specific polyamideimide precursor composition is not particularly limited, and examples thereof include various coating methods such as a spray coating method, a spin coating method, a roll coating method, a bar coating method, a slit die coating method, and an ink jet coating method.

Heating Step

Next, the coating film of the specific polyamideimide precursor composition is subjected to a drying treatment. By this drying treatment, a dried film (dried film before imidization) is formed.

For the heating conditions for the drying treatment, the heating temperature is, for example, preferably from 80° C. to 200° C., the heating time is preferably from 10 minutes to 60 minutes, and when the temperature is higher, the heating time may be shorter. During the heating, hot air blowing is also effective. During the heating, the temperature may be raised stepwise or raised without changing the rate.

Next, the dried film is subjected to an imidization treatment. Thus, a polyamideimide resin layer is formed.

With respect to the heating conditions for the imidization treatment, the imidization reaction is performed, for example, by heating at 150° C. to 400° C. (preferably 200° C. to 300° C.) for 20 minutes to 60 minutes, thereby forming a polyamideimide resin layer. During the heating reaction, heating is preferably carried out by gradually raising the temperature stepwise or at a constant rate before reaching the final temperature of heating.

Through the steps above, a polyamideimide molded article is formed. Further, if desired, a polyamideimide molded article is taken out from the object to be coated and subjected to post-processing.

Polyamideimide Molded Article

The polyamideimide molded article according to the present exemplary embodiment is a polyamideimide molded article molded by subjecting the polyamideimide precursor composition according to the present exemplary embodiment to a heating treatment. That is, the polyamideimide molded article according to the present exemplary embodiment is a polyamideimide molded article obtained by the method for preparing the polyamideimide molded article according to the present exemplary embodiment. Examples of this polyamideimide molded article include various polyamideimide molded articles such as a liquid crystal alignment film, a passivation film, an electrical wire coating material, and an adhesive film. Other examples of the polyamideimide molded article include a flexible electronic-substrate film, a copper-clad laminated film, a laminate film, an electrical insulation film, a porous film for a fuel cell, a separation film, a heat-resistant film, an IC package, a resist film, a flattened film, a microlens-array film, and an optical-fiber-coating film.

Other examples of the polyamideimide molded article include a belt member. Examples of the belt member include a driving belt, a belt for an electrophotographic image forming apparatus (for example, an intermediate transfer belt, a transfer belt, a fixing belt, and a transport belt).

That is, the method for preparing the polyamideimide molded article according to the present exemplary embodiment may be applied to various methods for preparing polyamideimide molded articles as exemplified above.

The polyamideimide molded article according to the present exemplary embodiment includes the aqueous solvent included in the specific polyamideimide precursor composition in some cases.

In a case where the aqueous solvent is contained in the polyamideimide molded article according to the present exemplary embodiment, the amount thereof is, for example, 1 ppb or more and less than 1% in the polyamideimide molded article. The amount of the aqueous solvent contained in the polyamideimide molded article is determined by means of gas chromatography on the gas fraction generated by heating the polyamideimide molded article.

EXAMPLES

Hereinafter, Examples will be described below, but the invention is not limited to these Examples. Further, in the description below, both of "parts" and "%" are based on weight unless specified otherwise.

Example 1

Preparation of Polyamideimide Precursor Composition (A-1)

869.52 g of water as a polymerization solvent and a composition solvent is charged into a flask equipped with a stirring rod, a thermometer, and a dropping funnel. 30.16 g (150.60 mmoles) of 4,4'-diaminodiphenyl ether (hereinafter denoted as ODA: molecular weight of 200.24) and 30.48 g (301.32 mmoles) of methylmorpholine (hereinafter denoted as MMO: an aliphatic cyclic tertiary amine compound) are added thereto and the mixture is dispersed therein by stirring at 20° C. for 10 minutes. To this solution is added 69.84 g (149.08 mmoles) of an exemplary compound (TC-01) (hereinafter denoted as PPHT: molecular weight of 468.47) being tetracarboxylic dianhydride, and the mixture is dissolved and reacted by stirring for 24 hours while maintaining the reaction temperature at 20° C., thereby obtaining a polyamideimide precursor composition (A-1) having a viscosity of 100 Pa·s and a solid content of 9.5%.

In addition, the imidization rate of the polyamideimide precursor thus produced is 0.02, and as a result of the measurement of the amount of the terminal amino group as described above, it is found that the produced polyamideimide precursor contains at least a terminal amino group.

Here, various measurement methods are as below.

Method for Measuring Viscosity

The viscosity is measured using an E-type viscometer under the following conditions.

Measurement apparatus: E-type rotating viscometer TV-20H (TOKI SANGYO Co., Ltd.)
Measurement probe: No. 3-type rotor 3°×R14
Measurement temperature: 22° C.

Method for Measuring Solid Content

The solid content is measured using a thermo gravimetry/differential thermal analyzer under the following conditions. Further, the value measured at 380° C. is used and the solid content is measured as a proportion of the solid content as polyamideimide.

Measurement apparatus: Thermo Gravimetry/Differential Thermal Analyzer TG/DTA 6200 (Seiko Instruments Inc.)
Measurement range: 20° C. to 400° C.
Rate of temperature increase: 20° C./min Imidization Rate of Polyamideimide Precursor Preparation of Polyamideimide Precursor Sample (i) The polyamideimide precursor composition to be measured is coated onto a silicon wafer in a film thickness in a range of 1 μm to 10 μm to prepare a coating film sample.

(ii) The coating film sample is dipped in tetrahydrofuran (THF) for 20 minutes to replace the solvent in the coating film sample with tetrahydrofuran (THF). The solvent for dipping is not limited to THE and may be selected from solvents that do not dissolve the polyamideimide precursor and may be miscible with a solvent component contained in the polyamideimide precursor composition. Specifically, an alcohol solvent such as methanol and ethanol and an ether compound such as dioxane may be used.

(iii) The coating film sample is taken out of the THF, and $N_2$ gas is blown onto THE attached to the surface of the coating film sample to remove THF. The coating film sample is dried by treating the coating film sample for 12 hours or longer in the range of 5° C. to 25° C. under a pressure reduced to 10 mmHg or less, thereby preparing a polyamideimide precursor sample.

Preparation of 100% Imidized Standard Sample (iv) The polyamideimide precursor composition to be measured is coated onto a silicon wafer in the same manner as in the section (i) above to prepare a coating film sample.

(v) The coating film sample is heated for 60 minutes at 400° C. to perform an imidization reaction, thereby preparing a 100% imidized standard sample.

Measurement and Analysis (vi) By using a Fourier transform infrared spectrophotometer (FT-730 manufactured by HORIBA, Ltd.), the infrared absorption spectra of the 100% imidized standard sample and the polyamideimide precursor sample are measured. The 100% imidized standard sample is measured to obtain a ratio I' (100) of an absorption peak (Ab' (1780 cm$^{-1}$)) derived from an imide bond around 1700 cm$^{-1}$ to an absorption peak (Ab' (1500 cm$^{-1}$)) derived from an aromatic ring around 1500 cm$^{-1}$.

(vii) Likewise, the polyamideimide precursor sample is measured to determine a ratio I (x) of an absorption peak (Ab (1700 cm$^{-1}$)) derived from an imide bond around 1700 cm$^{-1}$ to an absorption peak (Ab (1500 cm$^{-1}$)) derived from an aromatic ring around 1500 cm$^{-1}$.

In addition, by using the respective absorption peaks I' (100) and I (x) thus measured, an imidization rate of the polyamideimide precursor is calculated based on the following formula.

Imidization rate of polyamideimide precursor=$I(x)/I'(100)$                    Formula 1:

$I'(100)=(Ab'(1700\ cm^{-1}))/(Ab'(1500\ cm^{-1}))$     Formula 2:

$I(x)=(Ab(1700\ cm^{-1}))/(Ab(1500\ cm^{-1}))$     Formula 3:

Moreover, this measurement of an imidization rate of the polyamideimide precursor is applied to the measurement of an imidization rate of an aromatic polyamideimide precursor. For measuring the imidization rate of an aliphatic polyamideimide precursor, instead of the absorption peak of an aromatic ring, a peak derived from a structure that does not change before and after the imidization reaction is used as an internal standard peak.

Preparation of Film

The obtained polyamideimide precursor composition (A-1) is used to carry out film preparation, and the film thus prepared is evaluated in terms of its film forming properties. Further, the mechanical strength (tensile strength and tensile elongation), and light transmittance of the obtained film thus prepared is measured. Further, the imidization rate of the film (polyamideimide resin) thus prepared is also measured.

Method for Preparing Film

Coating is performed by a bar coating method using a coating blade equipped with a spacer to yield a coating thickness of 500 μm.

Coating substrate: glass plate having a thickness of 1.1 mm
Drying temperature: 60° C. for 10 minutes
Baking temperature: 250° C. for 30 minutes Film Forming Properties The prepared film is evaluated in terms of (1) void marks and (2) surface unevenness and patterns.

(1) Void Marks

The presence or absence of void marks on the surface of the prepared film is evaluated. The evaluation criteria are as follows.

A: Formation of void marks is not found.
B: It is possible to confirm 1 or more and less than 10 void marks on the surface of the prepared film.
C: There are 10 or more and less than 50 void marks scattered on the surface of the prepared film.
D: Numerous void marks are evenly formed on the surface of the prepared film.

(2) Surface Unevenness and Patterns

The presence or absence of surface unevenness and patterns formed on the surface of the prepared film is evaluated. The evaluation criteria are as follows.

A: Formation of surface unevenness and patterns is not found.
B: It is possible to confirm surface unevenness and patterns to a slight extent in a portion of the surface of the prepared film (less than 10% of the surface area of the coating film).

C: It is possible to confirm surface unevenness and patterns in a portion of the surface of the prepared film.

D: Surface unevenness and patterns are evenly formed on the surface of the prepared film (10% or more of the surface area of the prepared film).

Tensile Strength and Elongation

From the prepared film, a piece of sample is molded by punching by using a No. 3 dumbbell. A piece of the sample is installed in a tensile tester, and an applied load (tensile strength) at, which the sample undergoes tensile breaking and elongation at break (tensile elongation) are measured under the following conditions.

Measurement apparatus: Tensile tester 1605 type manufactured by Aikoh Engineering Co., Ltd.
Sample length: 30 mm
Sample width: 5 mm
Tensile rate: 10 mm/min Light Transmittance The light transmittance of the prepared film is measured under the following conditions.

Measurement apparatus: U-4000 type spectrophotometer (using an integrating sphere), manufactured by Hitachi Ltd.
Measurement wavelength: 300 nm to 1200 nm (compared with a wavelength of 550 nm)

Imidization Rate of Prepared Film (Polyamideimide Resin)

The polyamideimide precursor composition to be measured is coated onto a silicon wafer to a film thickness in the range of 1 μm to 10 μm, and subjected to drying and baking under the same conditions as the conditions for preparing the film, thereby preparing a sample. Using this sample, the imidization rate of the prepared film (polyamideimide resin) is measured by the same method for the imidization rate of the polyamideimide precursor.

Example 2

Preparation of Polyamideimide Precursor Composition (B-1) and Preparation of Film 900.00 g of N-methyl-2-pyrrolidone (hereinafter denoted as NMP) as a polymerization solvent is charged into a flask equipped with a stirring rod, a thermometer, and a dropping funnel. 30.16 g (150.60 mmoles) of ODA as a diamine compound is added thereto and the mixture is dispersed therein by stirring at 20° C. for 10 minutes. To this solution is added 69.84 g (149.08 mmoles) of PPHT (TC-01) as a tetracarboxylic dianhydride, and the mixture is dissolved and reacted by stirring for 24 hours while maintaining the reaction temperature at 20° C. The reaction solution is added to 5000 mL of pure water to precipitate a polyamideimide precursor. The polyamideimide precursor is separated by filtration, and 900.00 g of water and 26.86 g (301.32 mmoles) of dimethylaminoethanol (hereinafter abbreviated as DMAEt: molecular weight of 89.14) as the composition solvent are added thereto and the mixture is stirred at 20° C. for 4 hours to dissolve the resin, thereby obtaining a polyamideimide precursor composition (B-1) having a viscosity of 120 Pa·s and a solid content of 9.5%.

In addition, the imidization rate of the polyamideimide precursor thus produced is 0.02, and as a result of the measurement of the amount of the terminal amino group as described above, it is found that the produced polyamideimide precursor contains at least a terminal amino group.

Incidentally, a film is prepared and evaluated in the same manner as in Example 1, except for using the polyamideimide precursor composition (B-1).

Example 3

Preparation of Polyamideimide Precursor Composition (C-1) and Preparation of Film 810 g of tetrahydrofuran (hereinafter denoted as THF) and 90 g of water are charged into a flask equipped with a stirring rod, a thermometer, and a dropping funnel. 30.16 g (150.60 mmoles) of ODA as a diamine compound is added thereto and the mixture is dispersed therein by stirring at 20° C. for 10 minutes. To this solution is added 69.84 g (149.08 mmoles) of PPHT (TC-01) as a tetracarboxylic dianhydride, and the mixture is dissolved and reacted by stirring for 24 hours while maintaining the reaction temperature at 20° C., thereby obtaining a polyamideimide precursor composition (C-1) having a viscosity of 60 Pa·s and a solid content of 9.5%.

In addition, the imidization rate of the polyamideimide precursor thus produced is 0.02, and as a result of the measurement of the amount of the terminal amino group as described above, it is found that the produced polyamideimide precursor contains at least a terminal amino group.

Incidentally, a film is prepared and evaluated in the same manner as in Example 1, except for using the polyamideimide precursor composition (C-1).

Examples 4 to 12

Preparation of Films

Films are prepared and evaluated in the same manner as in Example 1, except that the conditions for preparing films (drying temperatures and baking temperatures) are changed according to Tables 1 and 2, and the polyamideimide precursor compositions (A-1), (B-1), and (C-1) prepared in Examples 1 to 3, respectively, are used.

Examples 13 to 15

Preparation of Polyamideimide Precursor Compositions (C-2), (C-3), and (C-4), and Preparation of Film In the same manner as in Example 3 (polyamideimide precursor composition (C-1)), except that the types and addition amounts of the tetracarboxylic dianhydride and the diamine compound are changed according to Table 3, polyamideimide precursor compositions (C-2), (C-3), and (C-4) are obtained.

Furthermore, films are prepared and evaluated in the same manner as in Example 1 except for using the polyamideimide precursor compositions (C-2), (C-3), and (C-4), respectively.

In addition, as a result of the measurement of the amount of the terminal amino group as described above for the produced polyamideimide precursor, it is found that the produced polyamideimide precursor contains at least a terminal amino group.

Comparative Examples 1 to 4

Preparation of Polyamideimide Precursor Composition (X-1) and Preparation of Film 900.00 g of NMP as a polymerization solvent and a composition solvent is charged into a flask equipped with a stirring rod, a thermometer, and a dropping funnel. 30.16 g (150.60 mmoles) of ODA as a diamine compound is added thereto and the mixture is dispersed therein by stirring at 20° C. for 10 minutes. To this solution is added 69.84 g (149.08 mmoles) of PPHT (TC-01) as a tetracarboxylic dianhydride, and the mixture is dissolved and reacted by stirring for 24 hours while maintaining the reaction temperature at 20° C., thereby obtaining a polyamideimide precursor composition (X-1) having a viscosity of 80 Pa's and a solid content of 9.5%.

In addition, the imidization rate of the polyamideimide precursor thus produced is 0.02, and as a result of the measurement of the amount of the terminal amino group as described above, it is found that the produced polyamideimide precursor contains at least a terminal amino group.

Incidentally, a film is prepared in the same manner as in Example 1, except that the conditions for preparing films (drying temperatures and baking temperatures) are changed according to Table 4, using the polyamideimide precursor composition (X-1), and evaluated.

Comparative Examples 5 to 8

Preparation of Polyimide Precursor Composition (X-2) and Preparation of Film 900.00 g of NMP as a polymerization solvent and a composition solvent is charged into a flask equipped with a stirring rod, a thermometer, and a dropping funnel. 48.36 g (241.51 mmoles) of ODA as a diamine compound is added thereto and the mixture is dispersed therein by stirring at 20° C. for 10 minutes. To this solution is added 51.64 g (236.75 mmoles) of pyromellitic dianhydride (hereinafter denoted as PMDA: molecular weight of 218.12) as a tetracarboxylic dianhydride, and the mixture is dissolved and reacted by stirring for 24 hours while maintaining the reaction temperature at 20° C., thereby obtaining a polyimide precursor composition (X-2) having a viscosity of 100 Pa·s and a solid content of 9.2%.

In addition, the imidization rate of the polyimide precursor thus produced is 0.04, and as a result of the measurement of the amount of the terminal amino group as described above, it is found that the produced polyimide precursor contains at least a terminal amino group.

Incidentally, a film is prepared and evaluated in the same manner as in Example 1, except that the polyimide precursor composition (X-2) is used and the conditions for preparing films (drying temperatures and baking temperatures) are changed according to Table 5.

Comparative Examples 9 to 12

Preparation of Polyimide Precursor Composition (X-3) and Preparation of Film 810 g of THF and 90 g of water, each as a polymerization solvent and a composition solvent, are charged into a flask equipped with a stirring rod, a thermometer, and a dropping funnel. 48.36 g (241.51 mmoles) of ODA as a diamine compound is added thereto and the mixture is dispersed therein by stirring at 20° C. for 10 minutes. To this solution is added 51.64 g (236.75 mmoles) of PMDA as a tetracarboxylic dianhydride, and the mixture is dissolved and reacted by stirring for 24 hours while maintaining the reaction temperature at 20° C., thereby obtaining a polyimide precursor composition (X-3) having a viscosity of 60 Pa·s and a solid content of 9.2%.

In addition, the imidization rate of the polyimide precursor thus produced is 0.04, and as a result of the measurement of the amount of the terminal amino group as described above, it is found that the produced polyimide precursor contains at least a terminal amino group.

Incidentally, a film is prepared and evaluated in the same manner as in Example 1, except that the polyimide precursor composition (X-3) is used and the conditions for preparing films (drying temperatures and baking temperatures) are changed according to Table 6.

Hereinafter, the respective Examples and the evaluation results therefor are outlined in Tables 1 to 6.

TABLE 1

| Example | | Example 1 | Example 2 | Example 3 | Example 4 | Example 5 | Example 6 |
|---|---|---|---|---|---|---|---|
| Polyamideimide precursor composition | | A-1 | B-1 | C-1 | A-1 | A-1 | A-1 |
| Method for preparing composition | | Polymerization in water in the coexistence of amine | Polymerization in NMP precipitation, solvent substitution | Polymerization in mixed aqueous solvent | Polymerization in water in the coexistence of amine | Polymerization in water in the coexistence of amine | Polymerization in water in the coexistence of amine |
| Tetracarboxylic dianhydride | Compound | PPHT | PPHT | PPHT | PPHT | PPHT | PPHT |
| | Addition amount (g) | 69.84 | 69.84 | 69.84 | 69.84 | 69.84 | 69.84 |
| | Addition amount (mmoles) | 149.08 | 149.08 | 149.08 | 149.08 | 149.08 | 149.08 |
| Diamine compound | Compound | ODA | ODA | ODA | ODA | ODA | ODA |
| | Addition amount (g) | 30.16 | 30.16 | 30.16 | 30.16 | 30.16 | 30.16 |
| | Addition amount (mmoles) | 150.60 | 150.60 | 150.60 | 150.60 | 150.60 | 150.60 |
| Polymerization solvent | Compound | Water | NMP | THF/Water | Water | Water | Water |
| | Addition amount (g) | 869.52 | 900.00 | 810/90 | 869.52 | 869.52 | 869.52 |
| Composition solvent | Compound | Water | Water | THF/Water | Water | Water | Water |
| | Addition amount (g) | 869.52 | 900.00 | 810/90 | 869.52 | 869.52 | 869.52 |
| Organic amine compound | Compound | MMO | DMAEt | — | MMO | MMO | MMO |
| | Addition amount (g) | 30.48 | 26.86 | — | 30.48 | 30.48 | 30.48 |
| | Addition amount (mmoles) | 301.32 | 301.32 | — | 301.32 | 301.32 | 301.32 |

TABLE 1-continued

| Example | Example 1 | Example 2 | Example 3 | Example 4 | Example 5 | Example 6 |
|---|---|---|---|---|---|---|
| Ratio of molar equivalents (tetracarboxylic dianhydride/diamine compound) | 0.9899 | 0.9899 | 0.9899 | 0.9899 | 0.9899 | 0.9899 |
| Viscosity (Pa·s: 22°C.) | 100 | 120 | 60 | 100 | 100 | 100 |
| Solid content (%) | 9.5 | 9.5 | 9.5 | 9.5 | 9.5 | 9.5 |
| Imidization rate of polyamideimide precursor | 0.02 | 0.02 | 0.02 | 0.02 | 0.02 | 0.02 |
| Conditions for preparing film — Drying conditions | at 60°C. for 10 minutes | at 60°C. for 10 minutes | at 60°C. for 10 minutes | at 60°C. for 10 minutes | at 60°C. for 10 minutes | at 60°C. for 10 minutes |
| Conditions for preparing film — Baking conditions | at 200°C. for 30 minutes | at 200°C. for 30 minutes | at 200°C. for 30 minutes | at 150°C. for 30 minutes | at 250°C. for 30 minutes | at 300°C. for 30 minutes |
| Film forming properties — Void marks | A | A | A | A | A | A |
| Film forming properties — Surface unevenness and patterns | A | A | A | A | A | A |
| Mechanical strength — Tensile strength (N/mm$^2$) | 80 | 80 | 80 | 70 | 85 | 85 |
| Mechanical strength — Elongation | 50 | 50 | 50 | 40 | 50 | 50 |
| Light transmittance (%: 550 nm) | 95 | 95 | 96 | 98 | 94 | 92 |
| Imidization rate of film (polyamideimide) | 1.00 | 1.00 | 1.00 | 1.00 | 1.00 | 1.00 |

TABLE 2

| Example | | Example 7 | Example 8 | Example 9 | Example 10 | Example 11 | Example 12 |
|---|---|---|---|---|---|---|---|
| Polyamideimide precursor composition | | B-1 | B-1 | B-1 | C-1 | C-1 | C-1 |
| Method for preparing composition | | Polymerization in NMP, reprecipitation, solvent substitution | Polymerization in NMP, reprecipitation, solvent substitution | Polymerization in NMP, reprecipitation, solvent substitution | Polymerization in mixed aqueous solvent | Polymerization in mixed aqueous solvent | Polymerization in mixed aqueous solvent |
| Tetracarboxylic dianhydride | Compound | PPHT | PPHT | PPHT | PPHT | PPHT | PPHT |
| | Addition amount (g) | 69.84 | 69.84 | 69.84 | 69.84 | 69.84 | 69.84 |
| | Addition amount (mmoles) | 149.08 | 149.08 | 149.08 | 149.08 | 149.08 | 149.08 |
| Diamine compound | Compound | ODA | ODA | ODA | ODA | ODA | ODA |
| | Addition amount (g) | 30.16 | 30.16 | 30.16 | 30.16 | 30.16 | 30.16 |
| | Addition amount (mmoles) | 150.60 | 150.60 | 150.60 | 150.60 | 150.60 | 150.60 |
| Polymerization solvent | Compound | NMP | NMP | NMP | THF/Water | THF/Water | THF/Water |
| | Addition amount (g) | 900.00 | 900.00 | 900.00 | 810/90 | 810/90 | 810/90 |
| Composition solvent | Compound | Water | Water | Water | THF/Water | THF/Water | THF/Water |
| | Addition amount (g) | 900.00 | 900.00 | 900.00 | 810/90 | 810/90 | 810/90 |
| Organic amine compound | Compound | DMAEt | DMAEt | DMAEt | — | — | — |
| | Addition amount (g) | 26.86 | 26.86 | 26.86 | — | — | — |
| | Addition amount (mmoles) | 301.32 | 301.32 | 301.32 | — | — | — |
| Ratio of molar equivalents (tetracarboxylic dianhydride/diamine compound | | 0.9899 | 0.9899 | 0.9899 | 0.9899 | 0.9899 | 0.9899 |
| Viscosity (Pa·s: 22°C.) | | 120 | 120 | 120 | 60 | 60 | 60 |
| Solid content (%) | | 9.5 | 9.5 | 9.5 | 9.5 | 9.5 | 9.5 |
| Imidization rate of polyamideimide precursor | | 0.02 | 0.02 | 0.02 | 0.02 | 0.02 | 0.02 |
| Conditions for preparing film | Drying conditions | at 60°C. for 10 minutes | at 60°C. for 10 minutes | at 60°C. for 10 minutes | at 60°C. for 10 minutes | at 60°C. for 10 minutes | at 60°C. for 10 minutes |
| | Baking conditions | at 150°C. for 30 minutes | at 250°C. for 30 minutes | at 300°C. for 30 minutes | at 150°C. for 30 minutes | at 250°C. for 30 minutes | at 300°C. for 30 minutes |
| Film forming properties | Void marks | A | A | A | A | A | A |
| | Surface unevenness and patterns | A | A | A | A | A | A |
| Mechanical strength | Tensile strength (N/mm$^2$) | 80 | 85 | 85 | 80 | 85 | 85 |
| | Elongation | 50 | 50 | 50 | 50 | 50 | 50 |
| Light transmittance (%: 550 nm) | | 98 | 94 | 92 | 98 | 95 | 93 |
| Imidization rate of film (polyamideimide) | | 1.00 | 1.00 | 1.00 | 1.00 | 1.00 | 1.00 |

TABLE 3

| Example | | Example 13 | Example 14 | Example 15 |
|---|---|---|---|---|
| Polyamideimide precursor composition | | C-2 | C-3 | C-4 |
| Method for preparing composition | | Polymerization in mixed aqueous solvent | Polymerization in mixed aqueous solvent | Polymerization in mixed aqueous solvent |
| Tetracarboxylic dianhydride | Compound | PPHT | PSHT | PSHT |
| | Addition amount (g) | 81.09 | 75.06 | 84.78 |
| | Addition amount (mmoles) | 173.1 | 123.33 | 139.3 |
| Diamine compound | Compound | PDA | ODA | PDA |
| | Addition amount (g) | 18.91 | 24.94 | 15.26 |
| | Addition amount (mmoles) | 174.87 | 124.55 | 140.71 |
| Polymerization solvent | Compound | THF/Water | THF/Water | THF/Water |
| | Addition amount (g) | 810/90 | 810/90 | 810/90 |
| Composition solvent | Compound | THF/Water | THF/Water | THF/Water |
| | Addition amount (q) | 810/90 | 810/90 | 810/90 |
| Organic amine compound | Compound | — | — | — |
| | Addition amount (g) | — | — | — |
| | Addition amount (mmoles) | — | — | — |
| Ratio of molar equivalents (tetracarboxylic dianhydride/diamine compound) | | 0.9899 | 0.9902 | 0.9900 |
| Viscosity (Pa·s: 22° C.) | | 60 | 60 | 60 |
| Solid content (%) | | 9.5 | 9.5 | 9.5 |
| Imidization rate of polyamideimide precursor | | 0.04 | 0.04 | 0.06 |
| Conditions for preparing film | Drying conditions | at 60°C. for 10 minutes | at 60° C. for 10 minutes | at 60° C. for 10 minutes |
| | Baking conditions | at 200° C. for 30 minutes | at 200° C. for 30 minutes | at 200° C. for 30 minutes |
| Film forming properties | Void marks | A | A | A |
| | Surface unevenness and patterns | A | A | A |
| Mechanical strength | Tensile strength (N/mm$^2$) | 70 | 60 | 55 |
| | Elongation | 20 | 40 | 15 |
| Light transmittance (%: 550 nm) | | 96 | 92 | 94 |
| Imidization rate of film (polyamideimide) | | 1.00 | 1.00 | 1.00 |

TABLE 4

| Comparative Example | | Comparative Example 1 | Comparative Example 2 | Comparative Example 3 | Comparative Example 4 |
|---|---|---|---|---|---|
| Polyamideimide precursor composition | | X-1 | X-1 | X-1 | X-1 |
| Method for preparing composition | | Polymerization in NMP | Polymerization in NMP | Polymerization in NMP | Polymerization in NMP |
| Tetracarboxylic dianhydride | Compound | PPHT | PPHT | PPHT | PPHT |
| | Addition amount (g) | 69.84 | 69.84 | 69.84 | 69.84 |
| | Addition amount (mmoles) | 149.08 | 149.08 | 149.08 | 149.08 |
| Diamine compound | Compound | ODA | ODA | ODA | ODA |
| | Addition amount (g) | 30.16 | 30.16 | 30.16 | 30.16 |
| | Addition amount (mmoles) | 150.60 | 150.60 | 150.60 | 150.60 |
| Polymerization solvent | Compound | NMP | NMP | NMP | NMP |
| | Addition amount (g) | 900.00 | 900.00 | 900.00 | 810/90 |
| Composition solvent | Compound | NMP | NMP | NMP | NMP |
| | Addition amount (g) | 900.00 | 900.00 | 900.00 | 810/90 |
| Organic amine compound | Compound | — | — | — | — |
| | Addition amount (g) | — | — | — | — |
| | Addition amount (mmoles) | — | — | — | — |
| Ratio of molar equivalents (tetracarboxylic dianhydride/diamine compound | | 0.9899 | 0.9899 | 0.9899 | 0.9899 |

TABLE 4-continued

| Comparative Example | | Comparative Example 1 | Comparative Example 2 | Comparative Example 3 | Comparative Example 4 |
|---|---|---|---|---|---|
| Viscosity (Pa · s: 22° C.) | | 80 | 80 | 80 | 80 |
| Solid content (%) | | 9.5 | 9.5 | 9.5 | 9.5 |
| Imidization rate of polyamideimide precursor | | 0.02 | 0.02 | 0.02 | 0.02 |
| Conditions for preparing film | Drying conditions | at 60° C. for 10 minutes | at 60° C. for 10 minutes | at 60° C. for 10 minutes | at 60° C. for 10 minutes |
| | Baking conditions | at 200° C. for 30 minutes | at 150° C. for 30 minutes | at 250° C. for 30 minutes | at 300° C. for 30 minutes |
| Film forming properties | Void marks | A | A | A | A |
| | Surface unevenness and patterns | A | A | A | A |
| Mechanical strength | Tensile strength (N/mm$^2$) | 50 | 40 | 60 | 60 |
| | Elongation | 25 | 20 | 30 | 30 |
| Light transmittance (%: 550 nm) | | 80 | 80 | 85 | 65 |
| Imidization rate of film (polyamideimide) | | 0.70 | 0.10 | 1.00 | 1.00 |

TABLE 5

| Comparative Example | | Comparative Example 5 | Comparative Example 6 | Comparative Example 7 | Comparative Example 8 |
|---|---|---|---|---|---|
| Polyamideimide precursor composition | | X-2 | X-2 | X-2 | X-2 |
| Method for preparing composition | | Polymerization in NMP | Polymerization in NMP | Polymerization in NMP | Polymerization in NMP |
| Tetracarboxylic dianhydride | Compound | PMDA | PMDA | PMDA | PMDA |
| | Addition amount (g) | 51.64 | 51.64 | 51.64 | 51.64 |
| | Addition amount (mmoles) | 236.75 | 236.75 | 236.75 | 236.75 |
| Diamine compound | Compound | ODA | ODA | ODA | ODA |
| | Addition amount (g) | 48.36 | 48.36 | 48.36 | 48.36 |
| | Addition amount (mmoles) | 241.51 | 241.51 | 241.51 | 241.51 |
| Polymerization solvent | Compound | NMP | NMP | NMP | NMP |
| | Addition amount (g) | 900 | 900 | 900 | 900 |
| Composition solvent | Compound | NMP | NMP | NMP | NMP |
| | Addition amount (g) | 900 | 900 | 900 | 900 |
| Organic amine compound | Compound | — | — | — | — |
| | Addition amount (g) | — | — | — | — |
| | Addition amount (mmoles) | — | — | — | — |
| Ratio of molar equivalents (tetracarboxylic dianhydride/diamine compound) | | 0.9803 | 0.9803 | 0.9803 | 0.9803 |
| Viscosity (Pa · s: 22° C.) | | 100 | 100 | 100 | 100 |
| Solid content (%) | | 9.2 | 9.2 | 9.2 | 9.2 |
| Imidization rate of polyamideimide precursor | | 0.04 | 0.04 | 0.04 | 0.04 |
| Conditions for preparing film | Drying conditions | at 60° C. for 10 minutes | at 60° C. for 10 minutes | at 60° C. for 10 minutes | at 60° C. for 10 minutes |
| | Baking conditions | at 200° C. for 30 minutes | at 150° C. for 30 minutes | at 250° C. for 30 minutes | at 300° C. for 30 minutes |
| Film forming properties | Void marks | A | A | A | A |
| | Surface unevenness and patterns | A | A | A | A |
| Mechanical strength | Tensile strength (N/mm$^2$) | 220 | 150 | 300 | 300 |
| | Elongation | 50 | 30 | 80 | 80 |
| Light transmittance (%: 550 nm) | | 40 | 45 | 35 | 30 |
| Imidization rate of film (polyamideimide) | | 0.50 | 0.10 | 1.00 | 1.00 |

TABLE 6

| Comparative Example | | Comparative Example 9 | Comparative Example 10 | Comparative Example 11 | Comparative Example 12 |
|---|---|---|---|---|---|
| Polyamideimide precursor composition | | X-3 | X-3 | X-3 | X-3 |
| Method for preparing composition | | Polymerization in mixed aqueous solvent | Polymerization in mixed aqueous solvent | Polymerization in mixed aqueous solvent | Polymerization in mixed aqueous solvent |
| Tetracarboxylic dianhydride | Compound | PMDA | PMDA | PMDA | PMDA |
| | Addition amount (g) | 51.64 | 51.64 | 51.64 | 51.64 |
| | Addition amount (mmoles) | 236.75 | 236.75 | 236.75 | 236.75 |
| Diamine compound | Compound | ODA | ODA | ODA | ODA |
| | Addition amount (g) | 48.36 | 48.36 | 48.36 | 48.36 |
| | Addition amount (mmoles) | 241.51 | 241.51 | 241.51 | 241.51 |
| Polymerization solvent | Compound | THF/Water | THF/Water | THF/Water | THF/Water |
| | Addition amount (g) | 810/90 | 810/90 | 810/90 | 810/90 |
| Composition solvent | Compound | THF/Water | THF/Water | THF/Water | THF/Water |
| | Addition amount (g) | 810/90 | 810/90 | 810/90 | 810/90 |
| Organic amine compound | Compound | — | — | — | — |
| | Addition amount (g) | — | — | — | — |
| | Addition amount (mmoles) | — | — | — | — |
| Ratio of molar equivalents (tetracarboxylic dianhydride/ diamine compound | | 0.9803 | 0.9803 | 0.9803 | 0.9803 |
| Viscosity (Pa · s: 22° C.) | | 60 | 60 | 60 | 60 |
| Solid content (%) | | 9.2 | 9.2 | 9.2 | 9.2 |
| Imidization rate of polyamideimide precursor | | 0.04 | 0.04 | 0.04 | 0.04 |
| Conditions for preparing film | Drying conditions | at 60° C. for 10 minutes | at 60° C. for 10 minutes | at 60° C. for 10 minutes | at 60° C. for 10 minutes |
| | Baking conditions | at 200° C. for 30 minutes | at 150° C. for 30 minutes | at 250° C. for 30 minutes | at 300° C. for 30 minutes |
| Film forming properties | Void marks | A | A | A | A |
| | Surface unevenness and patterns | A | A | A | A |
| Mechanical strength | Tensile strength (N/mm$^2$) | 220 | 150 | 300 | 300 |
| | Elongation | 50 | 30 | 80 | 80 |
| Light transmittance (%: 550 nm) | | 40 | 45 | 35 | 30 |
| Imidization rate of film (polyamideimide) | | 0.50 | 0.10 | 1.00 | 1.00 |

From the results above, it can be seen that in the present Examples, the light transmittance at 550 nm is high (colorless) and the transparency is excellent, as compared with Comparative Examples.

In addition, it can be seen in the present Examples that the film forming properties are excellent, the mechanical strength is high, and low-temperature processability is exhibited.

Moreover, the abbreviations in Tables 1 to 6 are as follows. In addition, "-" in Tables 1 to 6 indicates that the component is not added.

Tetracarboxylic Dianhydride

PPHT (TC-01): Compound represented by the following structure

PSHT (TC-05): Compound represented by the following structure

PMDA: Pyromellitic dianhydride

Diamine Compound

ODA: 4,4'-Diaminodiphenyl ether

PDA: p-Phenylenediamine

Organic Amine Compound

MMO: Methylmorpholine

DMAEt: Dimethylaminoethanol

Solvent

THF: Tetrahydrofuran

NMP: N-Methyl-2-pyrrolidone

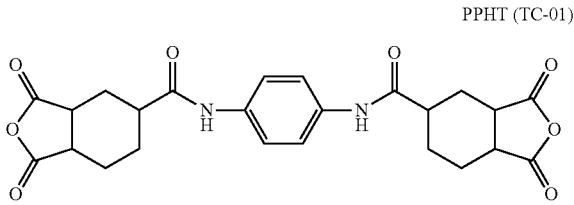 [SMILES: O=C(Nc1ccc(NC(=O)C2CCC3C(=O)OC(=O)C3C2)cc1)C1CCC2C(=O)OC(=O)C2C1]

PPHT (TC-01)

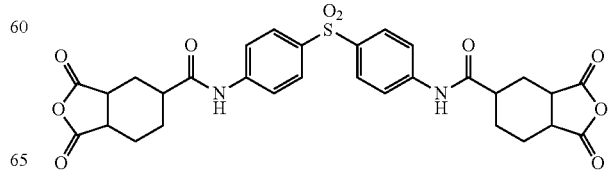

PSHT (TC-05)

What is claimed is:

1. A polyamideimide precursor composition, comprising a resin having repeating units represented by the following formula (PA) and a solvent including water, wherein the resin is dissolved in the solvent:

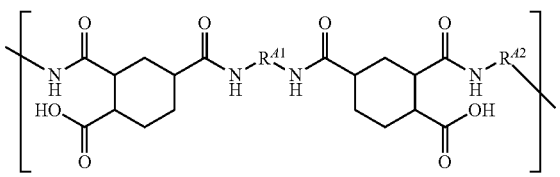

(PA)

wherein $R^{41}$ represents a divalent organic group and $R^{42}$ represents a divalent organic group.

2. The polyamideimide precursor composition according to claim 1, wherein $R^{41}$ in the formula (PA) represents a group represented by the following structure (T-1) or (T-2):

(T-1)

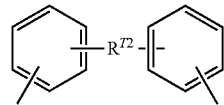

(T-2)

wherein $R^{72}$ represents —O—, —SO$_2$—, an alkylene group, or —O—$R^{73}$—O—, and $R^{73}$ represents an alkylene group.

3. The polyamideimide precursor composition according to claim 1, wherein the solvent is a mixed solvent of water and at least one organic solvent selected from a group consisting of a water-soluble ether solvent, a water-soluble ketone solvent, and a water-soluble alcohol solvent.

4. The polyamideimide precursor composition according to claim 3, wherein the boiling point of the organic solvent is 250° C. or lower.

5. The polyamideimide precursor composition according to claim 1, which further comprises an organic amine compound being dissolved in the solvent.

6. The polyamideimide precursor composition according to claim 5, wherein the organic amine compound is an aliphatic tertiary amine compound.

7. The polyamideimide precursor composition according to claim 6, wherein the organic amine compound is at least one compound selected from morpholines.

8. The polyamideimide precursor composition according to claim 1, wherein the resin is a resin synthesized from a tetracarboxylic dianhydride and a diamine compound, and the molar equivalents of the diamine compound are larger than the molar equivalents of the tetracarboxylic dianhydride.

9. The polyamideimide precursor composition according to claim 1, wherein the resin is a resin having a terminal amino group.

10. A polyamideimide molded article molded by subjecting the polyamideimide precursor composition according to claim 1 to a heating treatment.

11. A method for preparing a polyamideimide molded article, comprising subjecting the polyamideimide precursor composition according to claim 1 to a heating treatment.

* * * * *